Dec. 9, 1969     H. E. TEMPLE     3,482,673
PACKAGED BAKERY PRODUCT ORIENTING METHOD AND MECHANISM
Filed Oct. 27, 1967     4 Sheets-Sheet 1
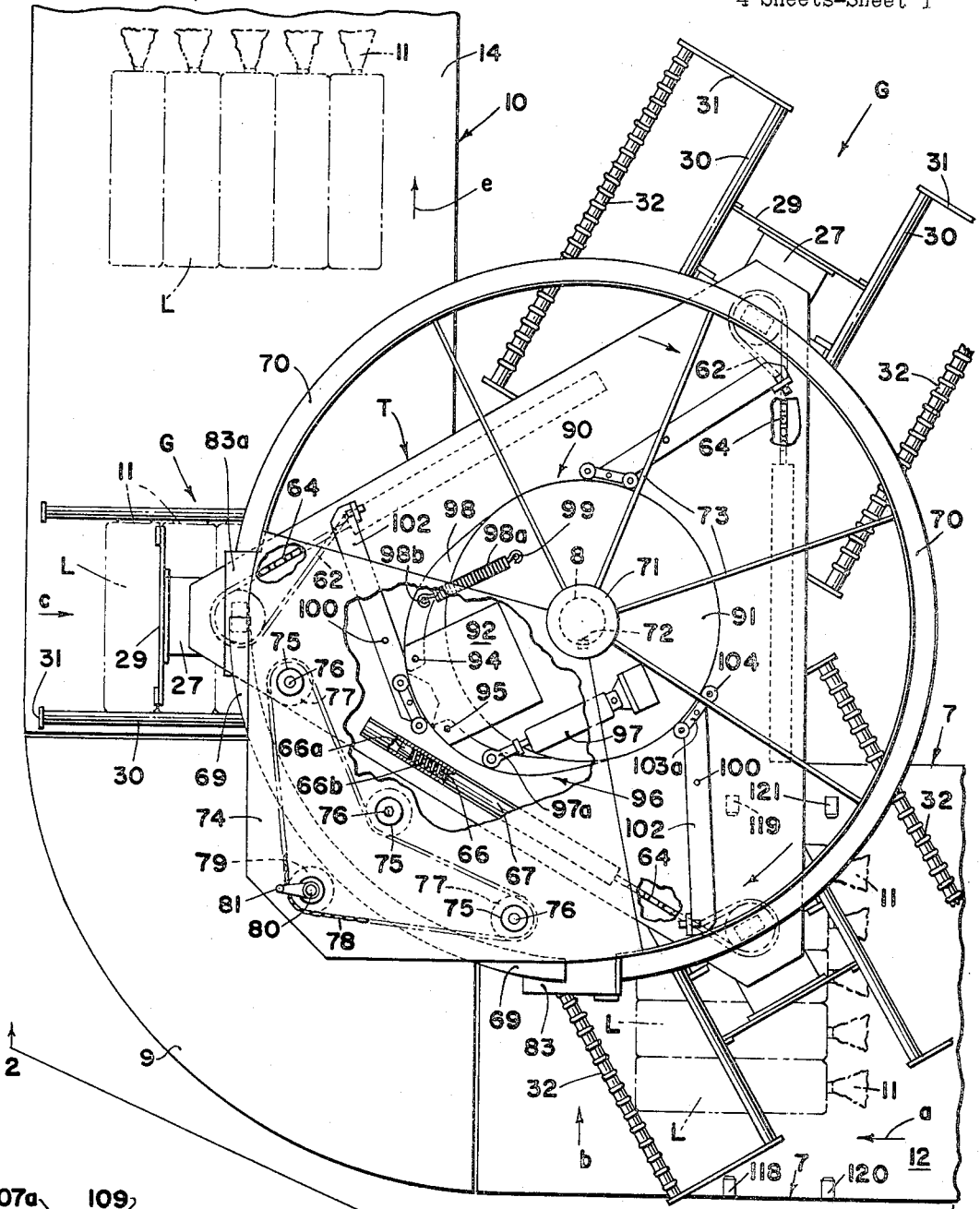
FIG.I.
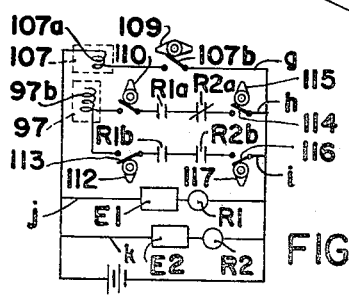
FIG.9.
INVENTOR
HIRAM E. TEMPLE
BY
Learman, Learman & McCulloch Dec. 9, 1969     H. E. TEMPLE     3,482,673
PACKAGED BAKERY PRODUCT ORIENTING METHOD AND MECHANISM
Filed Oct. 27, 1967     4 Sheets-Sheet 2

INVENTOR
HIRAM E. TEMPLE
BY
Learman, Learman & McCulloch

Dec. 9, 1969  H. E. TEMPLE  3,482,673
PACKAGED BAKERY PRODUCT ORIENTING METHOD AND MECHANISM
Filed Oct. 27, 1967  4 Sheets-Sheet 3

INVENTOR
HIRAM E. TEMPLE
BY
Learman, Learman & McCulloch

INVENTOR
HIRAM E. TEMPLE
BY
Learman, Learman & McCulloch

United States Patent Office 3,482,673
Patented Dec. 9, 1969

3,482,673
PACKAGED BAKERY PRODUCT ORIENTING METHOD AND MECHANISM
Hiram E. Temple, Saginaw, Mich., assignor to Baker Perkins Inc., Saginaw, Mich., a corporation of New York
Filed Oct. 27, 1967, Ser. No. 678,739
Int. Cl. B65g 47/24
U.S. Cl. 198—33                                 25 Claims

ABSTRACT OF THE DISCLOSURE

Methods and apparatus for selectively turning groups of forwardly advancing, bagged bread loaves and the like to deliver them in proper orientation to basket or tray loaders and wherein loaf gripping elements mounted for rotation through at least part of a revolution grip the loaves and move them through a path of travel, sensing means indicates the orientation of the loaves, and mechanism is operated in response to the sensing means to rotate certain of the gripped loaves through part of a revolution to a different orientation with respect to the direction of advancement.

---

One of the prime objects of the invention is to provide a bagged bread orienting mechanism and method of simple and reliable construction which is responsive to whether the bread is delivered from multiple bagging machines with the ponytails fore or aft and, as well, to the disposition the tray loading mechanism successively demands to orient the bread at high speeds consonant with the operation of other automatic processing machinery including the bagging and tray loading machinery.

Another object of the invention is to provide mechanism of the character described in which the motive power for turning certain groups of loaves end for end is provided by the turntable which moves the bread loaves through the orienting machine.

Other objects and advantages of the invention will be pointed out specifically or will become apparent from the following description when it is considered in conjunction with the appended claims and the accompanying drawings, in which:

In the drawings, FIGURE 1 is a top plan view of the apparatus showing the orienting cam shoes in retracted position as in a case where the products shown gripped by the gripping elements have been revolved through 180° to turn them end-for-end;

FIGURE 9 illustrates a typical schematic electrical control system which may be employed.

Figure 2:
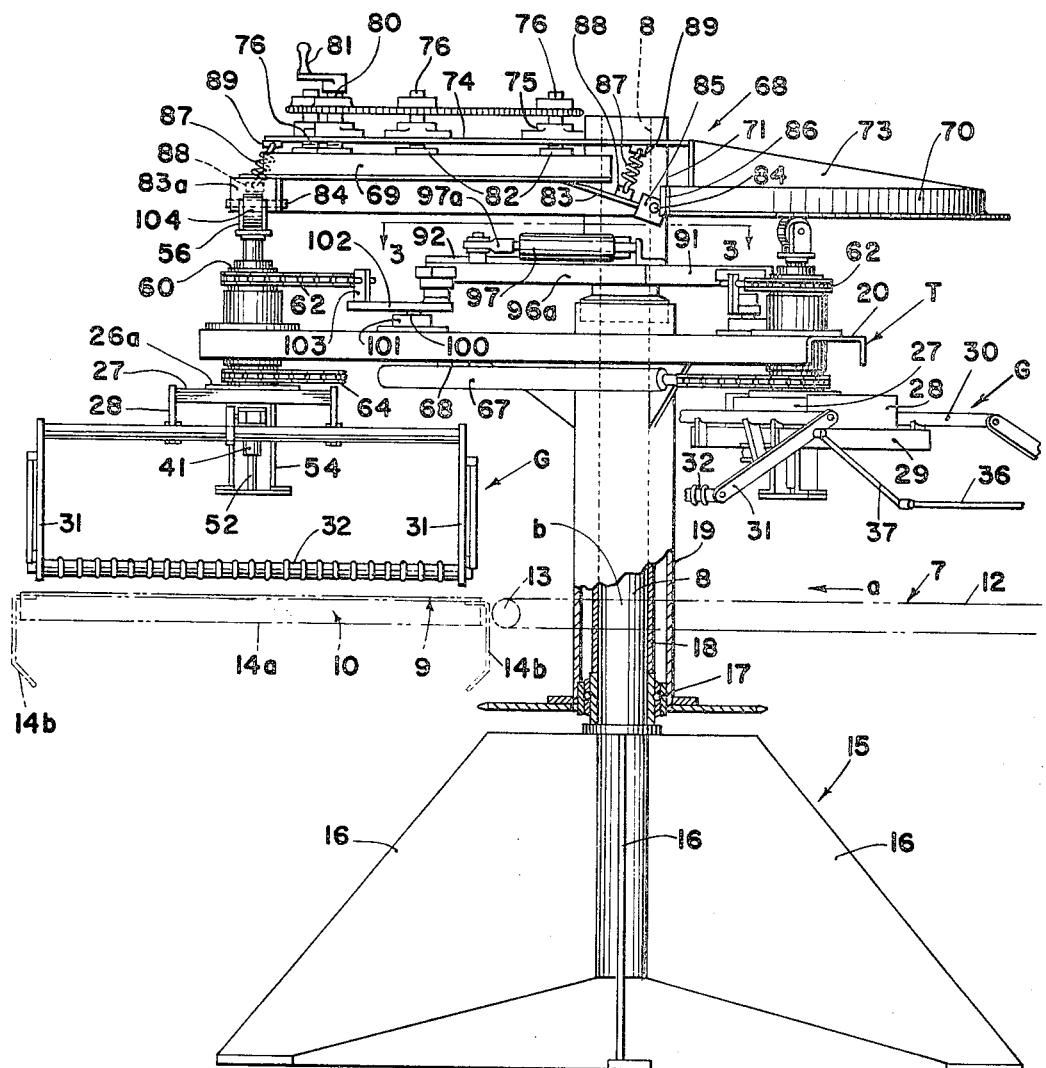
FIGURE 2 is an elevational view taken on the line 2—2 of FIGURE 1 and with certain parts being omitted in the interests of clarity.

Referring now more particularly to the accompanying drawings wherein a preferred embodiment of the invention only is shown, a numeral 7 generally indicates an endless supply conveyor member which moves groups of bread loaves L in the direction $a$ to a bread orienting station generally designated $b$ where they are picked up by one of a trio of peripheral gripper assemblies, generally designated G, depending from a turntable assembly, generally designated T, which is mounted for rotation on a central post 8. Each of the assemblies G is operated at the position $b$ to grasp a group of loaves L and, when the turntable assembly T has moved the particular gripper assembly G over a segment-shaped corner plate 9 to a second endless conveyor 10, to discharge them at position $c$ for outgoing travel in the direction $e$ to a machine which loads them onto relatively flat-bottomed trays or baskets.

FIGURE 1 illustrates a typical arrangement of the loaves L in which the ponytails 11 thereof are rearwardly facing but it is to be understood that a plurality of bagging machines may be feeding the conveyor 7 from opposite sides thereof and delivering groups of bagged loaves having ponytails which are randomly both rearwardly and forwardly disposed. The orienting system and method which will be described is a type which either does or does not rotate a particular groups of loaves 180° depending upon the orientation desired at the tray loading machine. The conveyor 7 may be considered to comprise any conventional endless conveyor having an upper run conveying surface 12 trained over driving rollers 13 and similarly the conveyor 10 may be considered to comprise an upper run endless conveying surface 14 trained around driving rollers 14a. Plate 9 is supported at the same level as conveyor runs 12 and 14 preferably by means such as the conveyor side plates shown at 14b.

The post 8 is fixed on a frame pedestal or base (see FIGURE 2) generally designated 15 which includes support legs 16 extending perpendicularly one to the other and journaled thereon by means such as bearings 17 separated by a spacer sleeve 18 is the turntable hub 19 of turntable 20.

THE GRIPPER ASSEMBLIES

Figure 5:
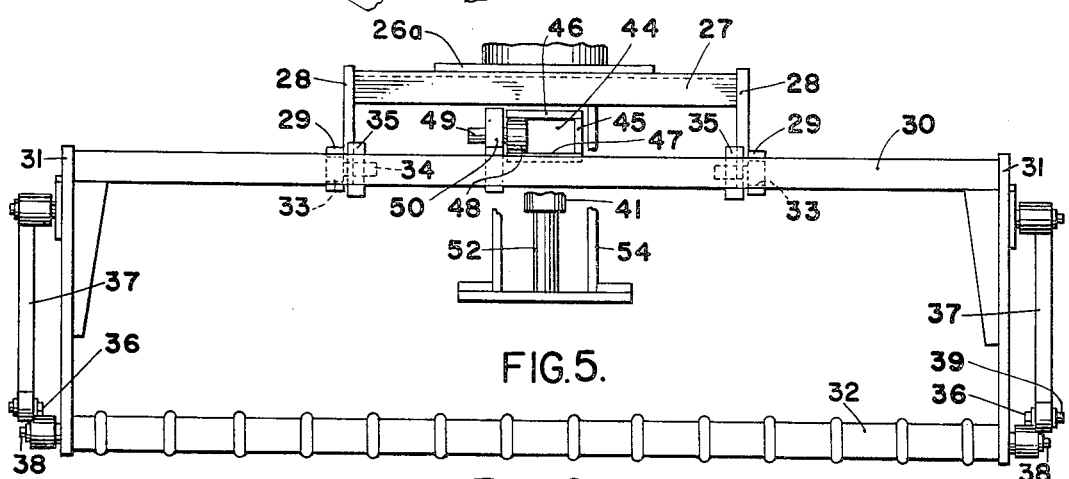
FIGURE 5 is an enlarged side elevational view of the gripper elements particularly.

It is to be understood that each of the three gripper assemblies G is identical in construction anod operates in exactly the same manner, so that a descrpition of one suffices for all. Each gripper assembly G includes an outer support sleeve 21 (see FIGURE 4) secured to the turntable plate 20 by a flange 22. The sleeve 21 and a bearing spacer sleeve 23 support upper and lower roller bearings 24 and 25, respectively, which journal an inner support sleeve 26 having a bottom flange 26a on which a channel-shaped support member 27 is fixed. End plates 28, depending from the member 27, support straps 29 which pivotally support gripper members which include oppositely disposed rods 30 at opposite ends of the straps 29 having dependent arm members 31 (see FIGURES 5 and 6) connected by spanning loaf-engaging rods 32. The rods 30 are pivotally connected to the plates 28 by means of rollers 33 rotatably journaled by the straps 29, the rollers 33 being mounted on bearings supported by shafts 34 fixed to arms 35 which are fixed at their opposite ends to the rods 30. For all practical purposes, the rollers 33 may simply be considered to be convenient bearings for pivotally connecting the gripper members to the gripper support assembly.

To prevent the bread loaves from being displaced in an endwise direction, a pair of links 36 and 37 connect the links 31 at the ends of each assembly, each link 36 being pivotally connected to the lower end of an arm 31, as at 38, and each link 37, which is pivotally connected to a link 36 at 39, being pivotally connected at its other end to the opposite arm 31 near its upper end as at 40. As FIGURE 6 indicates, the links 31 are movable from the gripping position in which they are shown in solid lines to the spread apart, raised position in which they are shown in chain lines.

Figure 4:
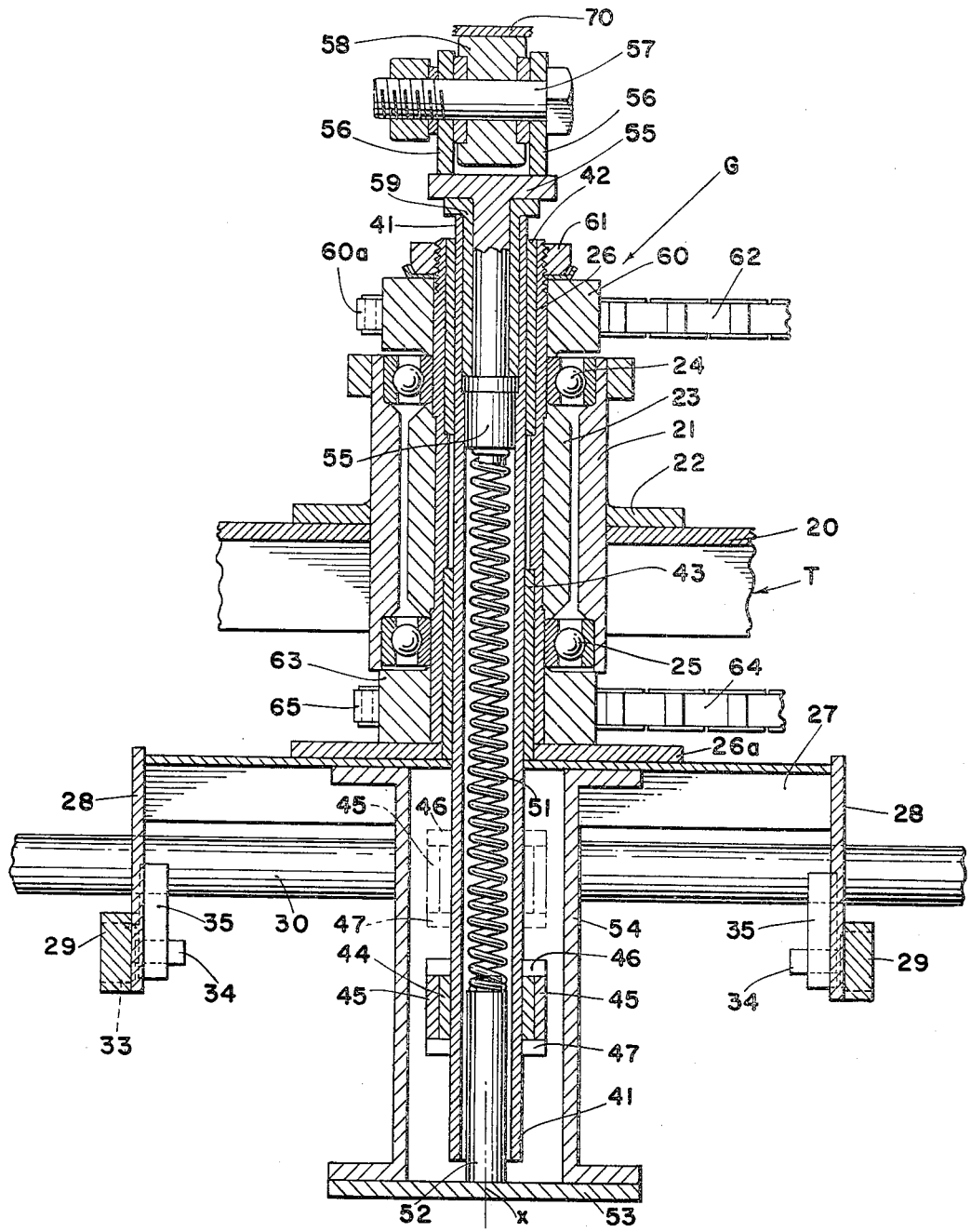
FIGURE 4 is an enlarged, fragmentary, sectional, side elevational view of one of the gripper assemblies.

Each gripper assembly G includes a cam actuated plunger tube 41 (see FIGURE 4) mounted for vertical sliding movement in the tubular member 26 by upper and lower slide bearing sleeves 42 and 43, respectively. When the plunger tube 41 is in the lowermost position in which it is shown in FIGURE 4, the gripper arms 31 are in the raised position shown in FIGURE 6 in chain lines. A clamp block 44 fixed to the tube 41 supports side bars 45 (see also FIGURE 6) which at their opposite ends support upper and lower bearing plates 46 and 47 projecting from opposite ends of the straps 45. Received between the pairs of plates 46 and 47 are follower rollers 48 mounted on follower shafts 49 which are fixed to connecting arms 50 welded to the rods 30. The rollers 48, which are mounted by bearings from the shafts 49 function as pivots for the arms 31 and their gripper rods 32.

Figure 6:
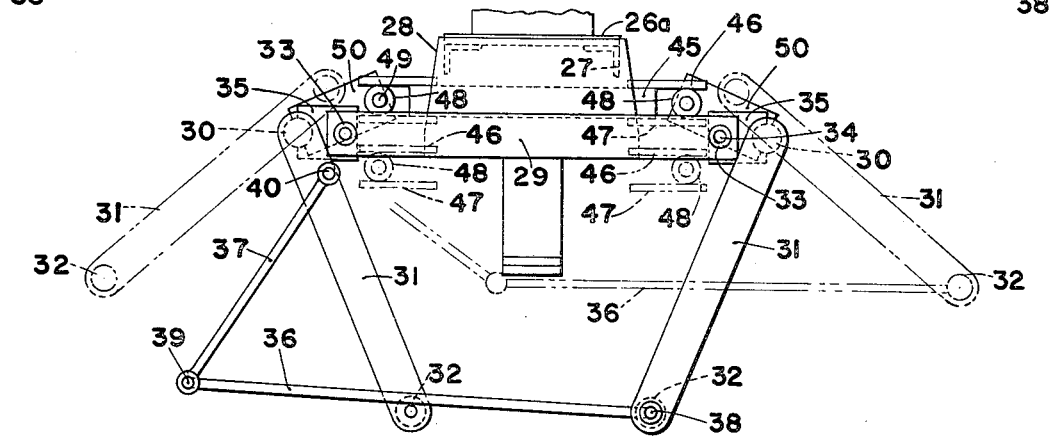
FIGURE 6 is an end elevational view thereof with solid lines indicating the closed or gripping position of the gripper members and the chain lines indicating the spread-apart raised position.

In order to normally maintain the plates 46 and 47 in the raised position in which they are shown in solid lines in FIGURE 6 and the arms 31 in the engaging position, a compression spring 51 is provided within the plunger tube 41, the spring 51 being supported at its lower end by a spring mount post 52 on a plate 53 which is connected by a housing member 54 to the plate 27 and so is prevented from moving in a vertical direction. At its upper end each spring 50 bears against an upper spring mount member 55 which mounts spaced apart plates 56, as shown in FIGURE 4. The plates 56 support a bolt member 57 on which a cam follower roller 58 is journaled, and a sleeve member 59 fixed to the plunger tube 41 insures upward movement of the plunger tube 41 when the spring 50 is permitted to move the spring mount member 55 upwardly.

It will be desirable in certain instances to rotate the gripper bars 32 about the gripper assembly axis x (see FIGURE 4) through 180° to turn the bread loaves end for end. To accomplish this an upper pulley member 60 is mounted on the sleeve 26 and secured in position by a means such as a nut member 61. The end of a flexible chain 62 is connected to a lug 60a on the pulley 60 in any suitable manner so that a pull on chain 62 will revolve the pulley member 60, and accordingly sleeve 26 and the gripper members 32 which are supported by it. Also mounted on each assembly is a second lower pulley member 63 having a chain 64 connected peripherally to the lug 65 on pulley member 63 and which may be connected to a plunger rod 66 disposed within a housing 67 (see FIGURES 1 and 2) which is fixed to the underside of turntable 20 as at 68. Each rod 66 which is provided with an enlarged spring seating head 66a is cooperable with a surrounding coil spring 66b which is compressed by the head 66a when the pulley 60 is rotated to turn the gripper assembly through 180° and then, when it is permitted to expand, revolves the pulley member 63 and restores the gripper assembly G to original position.

THE PLUNGER TUBE OPERATING CAM TRACK ASSEMBLY

Mounted on the upper end of the stationary support post 8 is an annular cam track assembly generally designated 68 which includes an upper arcuate cam track angle member 69 (see FIGURES 1 and 2) extending substantially from the location b around to the location c, and a lower arcuate cam track angle member 70. Because it is desirable to vertically adjust the upper cam track 69, it is supported separate from the lower track 70. At the upper end of post 8 a cam supporting hub 71 is keyed to the post 8 as at 72 and mounts spoke members 73 which support the cam track 70 in fixed position. A support plate 74 is also mounted in fixed position by the sleeve 71 and supports a trio of bearing members 75 (see FIGURE 1) journaling shafts 76 on which pulleys 77 are keyed. A chain 78 is trained around pulleys 77 and also around a pulley 79 mounted on a shaft 80 to which a handle member 81 is secured, as shown particularly in FIGURES 1 and 2. The trio of shafts 76 are threaded at their lower ends and extend into nut members 82 secured to the track section 69. Since the nut members 82 are prevented from rotating, rotation of the shafts 76 by manipulation of handle 81 serves to adjust the track section 69 upwardly or downwardly, depending on the direction of rotation. To provide a gradual transfer or bridge between the ends of the track sections 69 and 70, gradually sloped bridge members 83, 83a are provided, as shown particularly in FIGURE 2, the bridge members 83 and 83a being fixed to pivotal shafts 84 carried by blocks 85 on radially inwardly extending plates 86 welded or otherwise suitably secured to the stationary cam track section 70. Springs 87 connected between lugs 88 on the bridge plates 83 and 83a and lugs 89 depending from the plate 74 maintain the upper ends of the bridge plates 83 and 83a in engagement with the lower surface of track section 69 regardless of the vertically adjusted position thereof. The bridge plates 83 and 83a are disposed so that the plunger tube 41 is gradually permitted to rise at the position b and is gradually forced downwardly at the position c. The cam track 69 prevents the loaf engaging members 32 from snapping shut beyond a predetermined setting and crushing the loaves at the position b when the loaves L are gripped.

THE GRIPPER ROTATING MECHANISM

Figure 3:
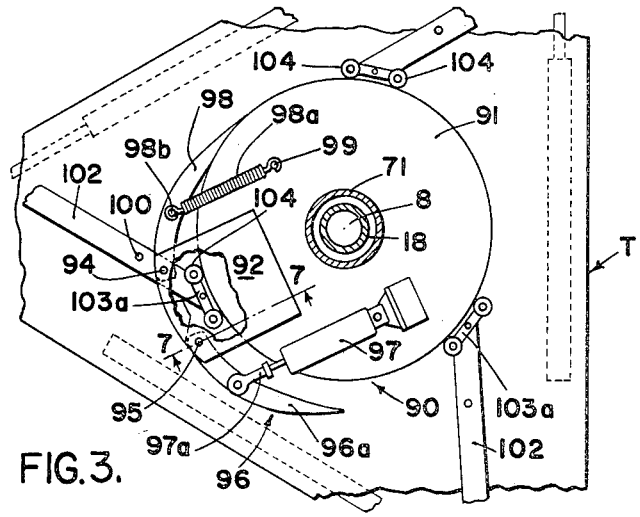
FIGURE 3 is a fragmentary top plan view taken as on the line 3—3 of FIGURE 2 but illustrating the expanded position of the orienting cam shoe members as in a case where the loaves are positioned as desired and will not require end-for-end turning.
Figure 7:
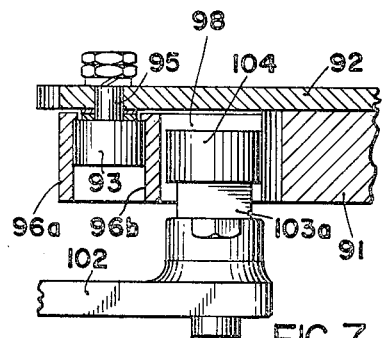
FIGURE 7 is a greatly enlarged sectional, elevational view taken on the line 7—7 of FIGURE 3 and illustrating the manner in which the orienting cam shoe members are pivotally mounted.

Mounted on the post 8 intermediate the ends thereof is nonrotary cam mechanism generally designated 90 (see FIGURES 1–3 and 7) which includes a circular disk member 91 fixed to the post 8. At the side of the cam disk 91 generally opposite position c, a support plate 92 is fixed to the disk 91 and mounts a pair of follower rollers 93 on shafts 94 and 95 (see FIGURES 1 and 3). An arcuate cam shoe member generally designated 96 and comprising side plate members 96a and 96b enclosing the roller 93 is pivotally mounted by the roller 93 for movement from the position shown in FIGURE 1 to the position shown in FIGURE 3 with energization of the solenoid operated, single-acting spring-returned air cylinder 97 which has a piston rod 97a pivotally connected to the shoe 96a. A similar mating cam shoe section 98 pivoted about the roller 93 on shaft 94 is connected by a spring 98a at 98b to a pin 99 on the disk 91 in a manner to normally hold the cam shoe 98 in the position in which it is shown in FIGURES 1 and 3.

Associated with each gripper assembly and mounted on a pivot shaft 100 supported in a bearing 101 on the turntable 20 is a follower lever 102 which is connected at a post 103 to chain 62. At its opposite end each lever 102 mounts an arm 103a having a pair of follower rollers 104 thereon which travel on either the outer wall 96a of the cam shoes 96 and 98, as shown in FIGURE 1, or on the peripheral surface of disk 91, as shown in FIGURE 3, dependent on whether the cam member 96 is in closed position as in FIGURE 1 or in expanded position as in FIGURE 3.

THE ELECTRICAL CONTROL CIRCUIT

Figure 8:
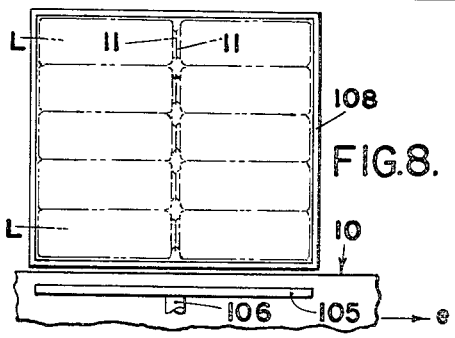
FIGURE 8 is a fragmentary top plan view illustrating the orientation desired in a tray to which groups of the loaves are loaded.

In FIGURE 8 I have shown a typical bread tray 108 in which the groups of loaves L are disposed, the tray, for instance, being of the type which has a side wall about ½ inch in height. It is desirable that the ponytails 11 be disposed inwardly, as shown in FIGURE 8, and accordingly it will be necessary to provide the loaves L to the discharge conveyor 10 alternately with the tails rearwardly disposed and forwardly disposed so that a transversely disposed pusher bar 105 connected with the piston rod 106 of a double acting cylinder 10 (see FIGURE 9) can move the groups of loaves to the shallow tray 108. In FIGURE 9 I have shown a typical electrical control system which is only illustrative of one which may be employed when it is desired to handle loaves which are received in random orientation at the turn-around mechanism. In circuit line g the solenoid 107a of the single-acting, spring-returned air cylinder 107 is connected in circuit with a cam operated switch 107b and it is to be understood that the lobes on the cam 109 are disposed just out of 180° alignment so that pusher bar 105 will be operated alternately to move a group of loaves L opposite first the rear end of a tray 108 and then the forward end. In circuit line h is connected the solenoid 97b of the air cylinder 97 which, when energized, operates to attract the piston rod 97a. A cam 110 which, like the cam 109, is mounted on a timing shaft, operates to close a switch 111 in circuit line h when rearwardly disposed ponytails are required at the tray 108. By the same token, a cam 112 operating a switch 113 in circuit line i operates to close the switch 113 when forwardly facing ponytails are required at the tray 108. Also provided in the circuit line h is a cam operated switch 114 operated by a cam 115 on a suitable timing shaft, and a like switch 116 is provided in circuit line i operated by a cam 117 on a suitable timing shaft. The photoelectric eye E–1 shown in circuit line j includes the light beam producing member 118 and the receiving photocell 119, as shown in FIGURE 1, and the photoelectric eye E–2 shown in circuit line k includes the beam producing element 120 and the photoelectric cell 121. A relay R–1 in circuit line j has normally open contacts R–1a and R–1b in circuit lines h and i, respectively, and a relay R–2 in circuit line k has normally closed contacts R–2a in circuit line h and normally open contacts R–2b in circuit line i.

In the operation of the device, it may be assumed that first of all the loaves L moving into position b have forwardly disposed ponytails 11 and must be turned end-for-end. The timing cam 115 operates to close switch 114 every time a group of loaves L reaches the position b. At this time the eye E–2 will not be operative because the ponytails 11 are forwardly disposed but the eye E–1 will be energized to energize relay R–1 and close normally open relay contacts R–1a. Since the relay contacts R–2a are normally closed, the circuit h is completed to solenoid 97b and the rod 97a of air cylinder 98 is retracted to move cam shoe 96 inwardly to the position in which it is shown in FIGURE 1. As FIGURE 1 indicates, then, the cam rollers 104 will ride over the exterior surface of the cams 96 and 98 and the particular arm 102 will be pivoted about its pivot shaft 100 as the particular gripper assembly G moves around from position b to position c to exert a pull on chain 62 to revolve pulley 60 and the gripper assembly G through an arc of 180°. At the position c in FIGURE 1, the chain 62 has been pulled outwardly to unwind it from the pulley 60 and revolve the pulley 60 and gripper assembly G. In FIGURE 1 the gripper assembly G at position c is commencing to travel downwardly on the bridge plate 83a and the gripper members 32 are just about to be spread to release the loaves L. If the tray 108 in the system were not calling for loaves with rearwardly disposed ponytails via cam 110, the cam 110 would have its lobe 180° moved from switch 111, which would be open, and so the loaves L would simply proceed to the tray in the tail-foremost position.

If the system, however, were calling for loaves L with their ponytails forwardly disposed via cam 112, the cam 112 would close switch 113 at the time the loaves reached position b. If the loaves at position b had rearwardly disposed tails, both eyes E–1 and E–2 would be engaged and the relays R–1 and R–2 would be energized so that normally open contacts R–1b and R–2b would be closed at the instant that timing cam 117 closed at the time the loaves L arrived at position b. Obviously the cams 115 and 117 are correlated with the spacing maintained between group loaves L on the supply conveyor surface 12 and their rate of travel. At this time the normally closed contacts R–2a will be open, of course.

Regardless of whether the orienting mechanism is to turn the bread loaves, the gripper rods 32 of each gripper assembly G are moved downwardly and together in each instance to grip the bread loaves L at the position b, and to slide them across the smooth surfaced dead plate 9 to the position c on conveyor 10, at which time the lower cam 70 is encountered by the follower roller 58 and moves the plunger tube 41 downwardly so that the gripper rods 32 are moved to their spread apart, raised position. As each gripper assembly G moves into position over a group of loaves at position b on the conveyor surface 12 traveling in the direction a, the downwardly pivoting trailing gripper rod 32 will first of all engage the trailing ends of the loaves and must move them toward the also closing leading rod 32 until the loaves are centered with respect to the rods 32. This centered position is necessary to insure that both rods 32 grip the loaves L and the loaves cannot become disarranged if it is necessary to turn them end for end. Links 36, 37 insure equal and simultaneous movement of the rods 32. At this time the follower roller 58 is passing from the lower track 70 to the carefully adjusted cam track 69. The forward or leading rod 32 in the direction of rotation y of turntable T had first of all moved over and cleared the leading ends of the loaves L. When the roller 58 of a particular gripper assembly G leaves the track 70 and the plunger tube 41 is permitted to move upwardly, the straps 45 are raised from the lower position shown in FIGURES 4 and 6 to their uppermost position, which pivots the arms 31 about the pivot points 33 to swing them inwardly from the position shown in chain lines in FIGURE 6 to the position shown in solid lines to grip the bread loaves. Since the spring 51 must be strong enough to cause the trailing rod 32 to move the bread loaves as described to a centered position, the gripping movement of rods 32 is limited by track 69 so that the very soft loaves are not crushed. Generally the cam track 69 is adjusted to a position with regard to loaves of a particular length so that the space between the rods 32 in closed position is 1–2 inches less than the particular length of loaf being handled. The position of cam track 69 can be conveniently adjusted during operation of the machine.

When the rollers 58 commence to travel on the bridge plate 83a at position c, downward movement of the plunger tube 41 will move the rollers 48 downwardly once again about pivots 33 to spread the arms 31 and bread-engaging rods 32.

Because the loaves may be disposed in the trays as indicated in FIGURE 8 with the ponytails inwardly facing and folded over, there need be no concern with the possibility of the ponytails becoming caught or jammed in subsequently employed handling mechanism or equipment.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

I claim:

1. Orienting mechanism for products such as groups of bagged bread loaves with ponytails at one end comprising: product support surface means including a forwardly moving conveyor; product gripping means mounted adjacent thereto and including normally spread apart clamp members actuable to a less spread apart position to grip the product; means for operating said product gripping means to grip the product; means for rotating said product gripping means through substantially 180° to turn the product end-for-end; sensing means sensitive to which end of the products is foremost; means responding to said sensing means for selectively operating said rotating means to either turn or not turn certain products; and means operating said product gripping means to release the prdouct.

2. The mechanism of claim 1 in which said clamp members depend from a vertical shaft and are mounted on said shaft such that they have upwardly and downwardly swinging pivotal movement toward and away from each other.

3. The mechanism of claim 2 in which turntable means is provided and peripherally spaced apart clamp member assemblies mounted thereon support said clamp members; means rotatably mounting said turntable means adjacent generally perpendicularly arranged generally horizontally disposed conveyor surfaces; and means for revolving said turntable means about a generally vertical axis.

4. The mechanism of claim 3 in which each clamp member assembly includes an actuator arm moving with said turntable means and connected to rotate the vertical shaft 180°, and cam means in the path of said arms selectively movable to a position in response to said sensing means for causing rotation of a particular shaft and the clamp members thereon.

5. The mechanism of claim 4 in which said cam means comprises a generally horizontally disposed stationary circular cam disk; and pivotally mounted arcuate cam shoe means forming a cam lobe thereon when in one position; and means operative responsive to said sensing means for swinging said shoe means horizontally outwardly to a position in which a part of said actuator arm is received between said disk and said lobe is ineffective to rotate the actuator arms.

6. The mechanism of claim 5 wherein each actuator arm is pivotally mounted intermediate its ends for movement in a generally horizontal plane; one end of each arm mounting a follower for engaging said cam shoe means and the other being connected by a flexible member to the periphery by one of said shafts; spring means being provided to normally urge each arm follower in a direction to engage said cam shoe means.

7. The mechanism of claim 3 in which each shaft carries vertically movable actuator rod means connected to said clamp members to swing them downwardly toward each other to clamp products between them and upwardly away from each other to a raised position at a level above the products to a position to straddle their ends; and cam track means supported stationarily in the rotary path of said rod means.

8. The mechanism of claim 7 in which said cam track means includes an arcuate portion supported at a higher level than another arcuate portion; spring means carried by each actuator rod means normally urging it upwardly; and linkage means connecting said actuator rod means and clamp members to translate vertical movement of said rod means into swinging movement of said clamp members.

9. The combination defined in claim 8 in which said perpendicularly arranged conveyor surfaces comprise endless conveyors separated by a stationary corner segment slide plate and said higher level track section extends above said segment plate so that said products are gripped adjacent one side of the segment plate, are slid across it and are released adjacent the other side.

10. The combination defined in claim 8 in which said higher level cam track portion is mounted for vertical adjustment.

11. The combination defined in claim 8 in which each actuator rod means comprises a tube coaxial with each said shaft and spring means within each tube biased to urge it toward said cam track means.

12. Orienting mechanism for products such as groups of bagged bread loaves with ponytails including: frame means; turntable means journaled thereon; conveyor means leading to said turntable means and away therefrom and bringing the products thereto; a plurality of circumferentially spaced clamp assemblies for gripping the products disposed on the turntable means and including clamp members movable to and from product gripping position; each clamp assembly including a follower arm connected to rotate said clamp members; cam means mounted by said frame means and engaged by said follower arms operable normally to maintain said clamp members in one rotary position; means operative to determine which ends of the products are foremost; and means operative responsive to said latter means for moving a portion of said cam means to selectively move a follower arm and rotate said clamp members.

13. The combination of claim 12 in which a stationary cam means is carried by said frame means and clamp member actuating means in follower engagement therewith actuates the clamp members on each clamp assembly to closed position during a portion of each rotary cycle of the turntable means.

14. Orienting mechanism for products such as groups of bread loaves comprising: product support surface means; spaced apart product gripping means mounted adjacent thereto; spring means for moving said product gripping means to a less spaced apart condition to move the product to a centered position between the gripping means and to grip the product; means for limiting the said movement of the gripping means to avoid crushing the product; means for selectively rotating said product gripping means to turn the product; and means operating said product gripping means to release the product.

15. The combination defined in claim 14 in which means is adjustable to change the position of the limiting means.

16. A method of orienting bread loaves comprising: engaging the loaves with one of a pair of gripper members and moving them to a centered position between the gripper member; gripping the centered loaves from opposite sides with the gripper members; selectively revolving the gripper members to turn them; and releasing the loaves.

17. Orienting mechanism for products such as groups of bread loaves including: frame means; turntable means journaled thereon; means leading to said turntable means and bringing the products thereto; a plurality of circumferentially spaced clamp assemblies for gripping the products disposed on the turntable means and including clamp members movable to and from product gripping position; each clamp assembly including clamp member revolving means; clamp member actuating means carried by each assembly and movable between positions in which said actuating means moves the clamp members together and apart; means normally urging said clamp members to move together; arcuate cam means mounted by said frame means and engaged by said actuating means, operable to release said clamp member actuating means in one rotary position of said turntable means to permit said actuating means to move said clamp members together and operable to operate said actuating means to open the clamp members in another rotary position of said turntable means; and means for operating said clamp member revolving means to turn said loaves while the turntable means is moving between said positions.

18. The condition defined in claim 17 in which said clamp member actuating means includes vertically movable follower members and said cam means comprises overhead cam tracks including one extending between said rotary positions which is adjustable vertically.

19. Orienting mechanism for products such as groups of bagged bread loaves with ponytails at one end comprising: product support surface means; spaced apart product gripping means mounted adjacent thereto connected at their ends by expandable linkage members; means for operating said product gripping means to grip the product; means for rotating said product gripping means through substantially 180° to turn the product end-for-end; sensing means sensitive to which end of the product is foremost; means responing to said sensing means for selectively operating said rotating means to either turn or not turn certain products; and means operating said product gripping means to release the product.

20. Orienting mechanism for products such as groups of bagged bread loaves with ponytails at one end comprising: product support surface means; spaced apart relatively movable clamp means movable from a product releasing to a product clamping position; means for operating said product clamping means to grip the product; means for rotating said product clamping means through substantially 180° to turn the product end-for-end; sensing means sensitive to which end of the product is foremost; means responing to said sensing means for selectively operating said rotating means to either turn or not turn certain products; and means operating said product clamping means to release the product.

21. Orienting mechanism for products such as groups of bagged bread loaves with ponytails at one end comprising: product gripping means including first and second relatively movable means for gripping the product from opposite sides; said first means including means for engaging the product and moving it to a centered position between said first and second gripper means before said first and second gripper means grip the product; means for selectively rotating said product gripping means to turn the product; and means operating said product gripping means to release the product.

22. Orienting mechanism for products such as groups of bagged bread loaves with ponytails at one end comprising: product support surface means; product gripping means mounted adjacent thereto; means for operating said product gripping means to grip the product; means for rotating said product gripping means through substantially 180° to turn the product end-for-end; sensing means sensitive to which end of the products are foremost; means responing to said sensing means for selectively operating said rotating means to either turn or not turn certain products; means operating said product gripping means to release the product; turntable means and peripherally spaced apart assemblies mounted thereon supporting said product gripping means; means rotatably mounting said turntable means over conveyor surfaces; and means for revolving said turntable means about a generally vertical axis.

23. Orienting mechanism for products such as groups of bagged loaves with ponytails at one end comprising: product support surface means; product gripping means mounted on a shaft adjacent thereto; means for operating said product gripping means to grip the product; said shaft being rotatable through substantially 180° to turn the product end-for-end; sensing means sensitive to which end of the product is foremost; means responding to said sensing means for selectively operating said rotating means to either turn or not turn certain products; means operating said product gripping means to release the product; turntable means and spaced apart assemblies mounted thereon supporting said product gripping means; each of said gripper assemblies including an actuator arm moving with said turntable means and connected to rotate said shaft; and cam means in the path of said arms selectively movable to a position in response to said sensing means for causing rotation of a particular assembly and the gripping means thereon.

24. Orienting mechanism for products such as groups of bagged bread loaves with ponytails at one end comprising: product support surface means; clamp members depending from a vertical shaft and movable to and from a product gripping position; means for operating said clamp members to clamp the product; means for rotating said clamp members through substantially 180° to turn the product end-for-end; sensing means sensitive to which end of the product is foremost; means responding to said sensing means for selectively operating said rotating means to either turn or not turn certain products; and means operating said product gripping means to release the product; each of said shaft carrying vertically movable actuator rod means connected to said clamp members to swing them downwardly toward each other to clamp products between them and to move the clamp members upwardly away from each other to a raised position at a level above the products so as to be movable over the products to a position to straddle their ends; and cam track means supported stationarily in the rotary path of said means.

25. Orienting mechanism for products such as groups of bread loaves including product support means; a plurality of circumferentially spaced clamp assemblies for gripping the product and including clamp members movable to and from a product gripping position; clamp member actuating means carried by each assembly and movable between positions in which said actuating means moves the clamp members together and apart; arcuate cam means mounted by said frame means and engaged by said actuating means, operable to release said clamp member actuating means in one rotary position of said turntable means to permit said actuating means to move said clamp members together and operable to operate said actuating means to open the clamp members in another rotary position of said turntable means.

References Cited

UNITED STATES PATENTS 2,877,884    3/1959    Esenwein _____ 198—33

EDWARD A. SROKA, Primary Examiner